(12) United States Patent
Kim

(10) Patent No.: US 6,861,454 B2
(45) Date of Patent: Mar. 1, 2005

(54) RAW MATERIALS FOR ANTI-CRACKING POLYURETHANE FOAMS AND METHOD FOR PREPARING THE SAME

(75) Inventor: Ju-Hyun Kim, Kyeongnam (KR)

(73) Assignee: LG Electronics Inc., Seoul (KR)

( * ) Notice: Subject to any disclaimer, the term of this patent is extended or adjusted under 35 U.S.C. 154(b) by 256 days.

(21) Appl. No.: 10/216,446

(22) Filed: Aug. 12, 2002

(65) Prior Publication Data

US 2003/0040549 A1 Feb. 27, 2003

(30) Foreign Application Priority Data

Aug. 16, 2001 (KR) ........................................ 2001-49345

(51) Int. Cl.⁷ ............................................... C08G 18/28
(52) U.S. Cl. ..................... 521/173; 521/130; 521/131; 521/167; 521/170; 521/172; 521/174; 521/176
(58) Field of Search .................... 521/130, 131, 521/167, 170, 172, 173, 174, 176

(56) References Cited

U.S. PATENT DOCUMENTS

| | | | | |
|---|---|---|---|---|
| 5,340,916 A | * | 8/1994 | Henn et al. ................. | 528/405 |
| 5,684,057 A | * | 11/1997 | White et al. ................. | 521/167 |
| 5,919,395 A | * | 7/1999 | Bastin et al. .......... | 252/182.24 |
| 6,201,033 B1 | * | 3/2001 | Mercando et al. .......... | 521/129 |
| 6,232,356 B1 | * | 5/2001 | Mercando et al. .......... | 521/129 |
| 6,420,446 B1 | * | 7/2002 | Chang ........................ | 521/172 |

* cited by examiner

*Primary Examiner*—John M. Cooney, Jr.
(74) *Attorney, Agent, or Firm*—Fleshner & Kim, LLP

(57) ABSTRACT

Raw materials for anti-cracking polyurethane foams comprises: a mixed polyol 100 weight parts; an isocyanate 140~180 weight parts; a catalyst 1.0~3.0 weight parts; water 1~2.5 weight parts; a foam blowing agent 30.0~35.0 weight parts; and an additive 1.0~3.0 weight parts, and a preparation method thereof.

21 Claims, 3 Drawing Sheets

RAW MATERIALS FOR ANTI-CRACKING POLYURETHANE FOAMS AND METHOD FOR PREPARING THE SAME

BACKGROUND OF THE INVENTION

1. Field of the Invention

The present invention relates to raw materials for polyurethane foams and a method for preparing the same. More particularly, the present invention relates to raw materials for anti-cracking polyurethane foams and a method for preparing the same.

2. Description of the Background Art

In general, polyurethane foams is obtained by reacting a polyol component and a isocyanate component in the presence of a foam blowing agent, a reaction catalyst and other additives.

The polyurethane foams have the most excellent adiabatic material among organic and inorganic adiabatic materials. With the merits of excellent adiabatic property due to the construction of independent pores and that a low density foams can be prepared by controlling a use amount and a type of a foam blowing agent, the polyurethane foams is generally adopted to a refrigerator, a freezing container or a low-temperature warehouse that need a high adiabatic property.

In case that rigid polyurethane foams are used for a refrigerator, it also serves to maintain an intensity of a refrigerator as well, besides the role as the adiabatic material.

In addition, a structure and configuration of the refrigerator affects a polyurethane flow, and the basic materials of a refrigerator are constructed by triple conjugate of iron/polyurethane foams/liner, so that a stress caused due to a difference of linear expansion coefficients of the materials is additionally applied to the refrigerator. Such a structure varies under many testing conditions in a refrigerator state according to mechanical characteristics of the polyurethane foams at a middle portion. Especially, failing to tolerate the stress, a foam crack occurs therein to even cause a crack in the liner being in contact therewith.

SUMMARY OF THE INVENTION

Therefore, an object of the present invention is to provide raw materials for polyurethane foams that is capable of reducing a physical property degradation of a vertical/horizontal flow portion of polyurethane foams and cracking caused by a linear expansion coefficient among triple conjugate (iron/polyurethane/liner).

Another object of the present invention is to provide a preparation method of polyurethane foams with a reduced crack.

To achieve these and other advantages and in accordance with the purpose of the present invention, as embodied and broadly described herein, there is provided raw materials for polyurethane foams comprises:

100 weight parts of a mixed polyol consisting of:
  45~60 wt. % of polyol (a) obtained by polymerization with an organic oxide by taking sorbitol of a hexa-valent functional group as an initiator,
  15~35 wt. % of polyol (b) obtained by polymerization with an organic oxide by taking toluene diamine (T.D.A.) of a tetra-valent functional group as an initiator,
  2.5~7.5 wt. % of polyol (c) obtained by polymerization with an organic oxide by taking ester of a penta-valent functional group as an initiator,
  10~15 wt. % of polyol (d) obtained by polymerization with an organic oxide by taking glycerin of tri-valent function group as an initiator, and
  as an arbitrary component, 0~10 wt. % of polyol (e) obtained by polymerization with an organic oxide by taking ethylene diamine (E.D.A) of tetra-valent functional group as an initiator;

140~180 weight parts of a isocyanate;
1.0~3.0 weight parts of a catalyst;
30.0~35.0 weight parts of a foam blowing agent;
1~2.5 weight parts of water; and
1.0~3.0 weight parts of an additive.

OH values of the mixed polyol composition are as follows:

(a) OH value of polyol (a) obtained by polymerization with an organic oxide by taking sorbitol of hexa-valent functional group as an initiator: 460

(b) OH value of polyol (b) obtained by polymerization with an organic oxide by taking T.D.A of a tetra-valent functional group as an initiator: 350

(c) OH value of polyol (c) obtained by polymerization with an organic oxide by taking ester of a penta-valent functional group as an initiator: 330

(d) OH value of polyol (d) obtained by polymerization with an organic oxide by taking glycerin of tri-valent function group as an initiator: 280

(e) OH value of polyol (e) obtained by polymerization with an organic oxide by taking E.D.A of tetra-valent functional group as an initiator: 635

The OH value signifies the value of mg of KOH required for neutralizing acetic acid combined with acetyl compound obtained from polyol 1 g (mgKOH/g), which is obtained by the following equation:

$$OHV = 56100 \times \text{the number of functional group of polyol/molecular weight of polyol}$$

The present invention also provides a method for preparing polyurethane foams by reacting a polyol component and a isocyanate component in the presence of water, a foam blowing agent, a reaction catalyst and other additives, wherein the polyol component is a mixed polyol consisting of 45~60 wt. % of polyol (a) obtained by polymerization with an organic oxide by taking sorbitol of a hexa-valent functional group as an initiator, 15~35 wt. % of polyol (b) obtained by polymerization with an organic oxide by taking T.D.A of a tetra-valent functional group as an initiator, 2.5~7.5 wt. % of polyol (c) obtained by polymerization with an organic oxide by taking ester of a penta-valent functional group as an initiator, 10~15 wt. % of polyol (d) obtained by polymerization with an organic oxide by taking glycerin of tri-valent function group as an initiator, and, as an arbitrary component, 0~10 wt. % of polyol (e) obtained by polymerization with an organic oxide by taking E.D.A of tetra-valent functional group as an initiator.

According to the present invention, rigid polyurethane foams without a crack can be prepared by mixing a mixed polyol composition having a special constitution, a isocyanate, water, a foam blowing agent, a special catalyst package and a resin stock solution containing additives.

DETAILED DESCRIPTION OF THE PREFERRED EMBODIMENTS

Each component of the present invention will now be described in detail.

Polyol

Currently, polyol used in the polyurethane industry is a poly-functional alcohol with an ether (C—O—C) structure, and obtained by polymerization with an organic oxide by taking a compound having two or more active hydrogens as an initiator.

In the present invention, besides the basic physical property, the physical property of polyol is improved by combining components in order to better an adhesive force.

Polyol (a) used in the present invention is obtained by polymerization with an organic oxide by taking sorbitol of a hexa-valent functional group as an initiator, and has an OH value of 460. Polybol (b) is obtained by polymerization with an organic oxide by taking T.D.A of a tetra-valent functional group as an initiator, and has an OH value of 350. Polyol (c) is obtained by polymerization with an organic oxide by taking ester of a penta-valent functional group as an initiator, and has an OH value of 330. Polyol (d) is obtained by polymerization with an organic oxide by taking glycerin of a tri-valent function group as an initiator, and has an OH value of 280. Polyol (e) is obtained by polymerization with an organic oxide by taking E.D.A of a tetra-valent functional group as an initiator, and has an OH value of 635.

Over the entire weight of polyol, polyol (a) is contained by 45~60 wt. %, polyol (b) is contained 15~35 wt. %, polyol (c) is contained 2.5~7.5 wt. %, polyol (d) is contained by 10~15 wt. %.

Polyol (e) is an arbitrary component, so that it may not be contained, and may be contained by 10 wt. % and below over the entire weight of polyol.

Isocyanate

Isocyanate is an organic compound containing isocyanate group (—NCO) in its molecule, making a principal component together with polyol in preparing polyurethane.

In the present invention, isocyanate such as MDI (diphenylmethane diisocyanate) or TDI (Toluene diisocyanate) can be used, which is generally used for preparation of polyurethane foams. In this respect, in the general polyurethane foams, a generally used index numeric is about 1.0~1.2, not much high.

Isocyanate is used by an amount of 140~180 weight parts per polyol 100 weight parts, and preferably, by an amount of about 160 weight parts per polyol 100 weight parts.

If isocyanate is used by less amount than the above range, it is difficult to form polyurethane foams, while if isocyanate is used by more amount than the above range, a low-temperature dimensional stability is degraded and breaks of foams occur.

Catalyst

A catalyst shortens a reaction time in formation of foams, and controls a flowability of foams related to generation of pores.

The catalyst used in the present invention is roughly divided into three kinds, that is, a foaming catalyst, a gelation catalyst and a trimerization catalyst.

The catalyst can be suitably controlled in its amount to use according to shape and structure of the real refrigerator, and in the present invention, it is used by the amount of 1.0~3.0 over polyol 100 weight parts.

A catalyst package of the present invention contains a catalyst 'A', a catalyst 'B' and an arbitrary catalyst 'C'.

The catalyst 'A' is obtained by mixing a gelling agent and the foaming catalyst by 1:1.

The gelling agent has an influence on a reactivity of foams. It attacks MDI, making MDI to react with polyol, to produce a polyurethane resin. Representative gelling agents include DMCHA (N,N-dimethyl cyclohexyl amine), TMHDA(tetra methyl hexane diamine), TEDA (triethylene diamine), or the like.

The foaming catalyst serves to facilitate a reaction between MDI to supply heat required for foaming, and accelerate polyol and MDI to make a resinification reaction. Representative foaming catalyst is a PMDETA (pentamethylene diethylene triamine), BDMEE, or the like.

The catalyst 'A' is used by the amount of 0.1~1.5 weight parts per polyol 100 weight parts.

The catalyst 'B' accelerates a trimerization reaction which forms isocyanurate as a trimer, by reacting three isocyanates, for which quaternary ammonium salt and 2,4,6-tris-dimethylaminomethyl)phenol) are used.

The catalyst 'B' is used by the amount of 0.1~0.5 weight parts per polyol 100 weight parts.

The catalyst 'C' is a mixed catalyst as a strong foaming catalyst, that is, the so-called formic acid. General use of the catalyst 'C' betters a flowability of a composition so that an end flowing of a polyurethane foam is improved. The catalyst 'C' is an arbitrary component, and it is used in case polyol (e), which is also an arbitrary component, is used. In case of being added, the catalyst 'C' is added by the amount of 1.0~1.5 weight parts per polyol 100 weight parts.

Foam Blowing Agent

Generally, foam blowing agents used for rigid polyurethane foams include water, carboxyl acid or fluoro carbon group foam blowing agent.

In the present invention, water as a chemical foam blowing agent and a fluoro carbon group foam blowing agent as a physical foam blowing agent are used as foam blowing agents.

Water is injected by the amount of 1~2.2 weight parts per polyol 100 weight parts, and preferably, by the amount of about 2 weight parts per polyol 100 weight parts.

If the amount of use of water over the polyol component 100 weight parts is less than 1 weight parts, a compression intensity or a low-temperature dimensional stability is degraded. If the amount of use of water exceeds 2 weight parts, a thermal conductivity is much degraded.

In the present invention, a dichloromonofluoroethane (HCFC-141b) is used as a fluoro carbon group foam blowing agent. The organic foam blowing agent is preferably used by the amount of about 30.0~35.0 weight parts over polyol 100 weight parts.

Additives

In the present invention, a silicon surface active agent, which is a foaming stabilizer, may be used.

Like in the rigid polyurethane foams, the silicon surface active agent improves a mixture efficiency without a mutual solubility, and stabilizes a cell by restraining formation and growth of irregular pores.

In the present invention, as an additive, the silicon surface active agent is used by the amount of 1.0~3.0 per polyol 100 weight parts, and preferably, by the amount of about 2.0 weight parts per polyol 100 weight parts.

As necessary, a stabilizer such as a filler, an antioxidant or an ultraviolet absorbent, and a colorant, which are generally used in other urethane chemistry, may be added As mentioned above, the rigid polyurethane foams of the present invention can be prepared by reacting a mixed polyol component of a particular composition and a polyisocyanate component as the principal raw materials in the presence of water, a foam blowing agent, a reaction catalyst package and additives.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

EXAMPLE

Example 1

Figure 1A:
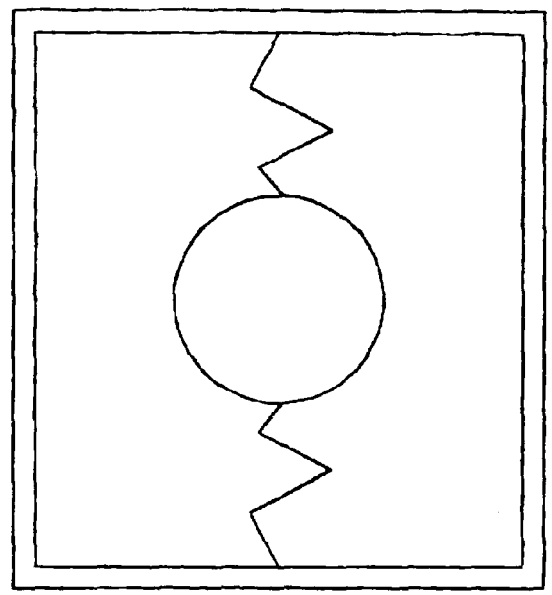
FIG. 1 is a schematic view showing an evaluating method of a foam cracking occurrence mechanism.

As shown in table 1, 100 weight parts of a mixed polyol (polyol (a), (b), (c) and (d)), 2.1 weight parts of water, 30.0~35.0 weight parts of HCFC-141b (dichloromofluoroethane) as a foam blowing agent, 2 weight parts of a silicon surface active agent, a catalyst package ('A', 'B' and 'C') and 160.95 weight parts of MDI (diphenylmethane diisocyanate) were mixed, on which foaming and hardening was performed to prepare a sample of rigid polyurethane foams.

Example 2

As shown in Table 1, 100 weight parts of a mixed polyol (polyol (a), (b), (c) (d) and (e)), 2 weight parts of water, 30.0~35.0 weight parts of HCFC-141b (dichloromofluoroethane) as a foam blowing agent, 2 weight parts of a silicon surface active agent, a catalyst package ('A', 'B' and 'C') and 160.31 weight parts of MDI (diphenylmethane diisocyanate) were mixed, on which foaming and hardening was performed to prepare a sample of rigid polyurethane foams.

TABLE 1

(injection amount unit: weight parts)

| Raw materials | Example 1 (HCFC-141b system) | Example 2 (HCFC-141b system) |
|---|---|---|
| Polyol a | 60 | 45 |
| Polyol b | 25 | 25 |
| Polyol c | 5 | 5 |
| Polyol d | 10 | 15 |
| Polyol e | | 10 |
| Water | 2.1 | 2.0 |
| Catalyst 'A' | 1.0~1.5 | 1.0~1.0 |
| Catalyst 'B' | 0.3 | 0.4 |
| Catalyst 'C' | | 1.2 |
| Silicon surface active agent | 2.0 | 2.0 |
| HCFC-141b | 30.0~35.0 | 30.0~35.0 |
| Isocyanate | 160.95 | 160.31 |

The polyurethane foams prepared with the raw materials in accordance with the present invention exhibit various physical properties according to a constitution of the raw material composition.

In addition, since the construction of system differs depending on the foam blowing agent, there can be a difference in the adiabatic value and the injection amount (JUST pack) of the foams. Both examples 1 and 2 used HCFC-141b system.

The physical property of the foams to be especially mentioned herewith is tan δ, alternative characteristics for a foam crack.

Tan δ was measured by using a general dynamic mechanical thermal analyzer (DMTA), and a visco-elasticity was evaluated by a ratio between a storage modulus and a loss modulus of polyurethane foams transmitted by applying 1 Hz frequency to a test sample.

A large visco-elasticity signifies that the loss modulus is greater than the storage modulus, and such a rigid foam is weak for cracking.

Visco-elasticity: tan δ

Modulus: $E_1=(\sigma_0/e_0)\cos \sigma$ (storage modulus) and $E_2=(\sigma_0/e_0)\sin \sigma$ (loss modulus)

$\tan \delta = \sin \sigma / \cos \sigma = E_2/E_1$

As noted in the above definitions, if the loss modulus for resolving a stress is greater than the storage modulus produced upon receiving a stress transmitted to polyurethane foams, the value of tan δ becomes great, so that a resistance force against the cracking of polyurethane foams becomes great.

As a matter of course, besides the above described method, a foam crack testing can be performed under a desired temperature and environment conditions by using a jig.

As shown in FIG. 1, the foam crack testing was performed by using a testing method that a visco-elasticity effect is mixed to a tension, a bending and a geometric effect, which is as follows.

A foam crack testing can be performed under various environments and temperatures as intended by fabricating a general jig as shown in FIG. 1, and a foam crack related testing can be preformed by the following three methods.

As shown in FIG. 1A, test 1 uses an apparatus devised to be initiated from a marginal portion of a circle, the weakest portion, and indicating a tension situation.

The central portion of a square jig is open in a circular form and the marginal portion of the circle is weakest, so that when a temperature is changed, existence or nonexistence of a crack at this portion is evaluated.

Figure 1B:
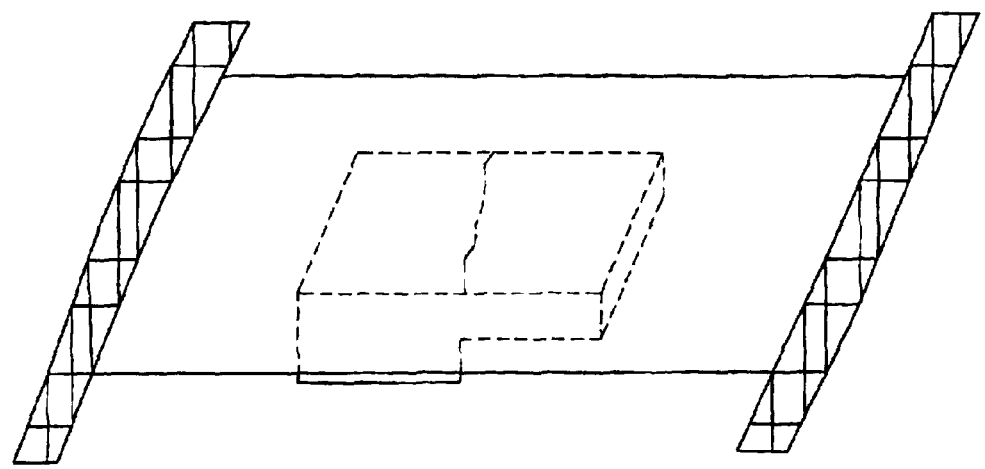

As shown in FIG. 1B, test 2 uses an apparatus for measuring a bending situation to evaluate a situation that polyurethan flowing differs due to a thickness difference. Foam crack existence and nonexistence is tested at the portion with the weakest thickness change when an external force is applied to foams with different thicknesses.

Figure 1C:
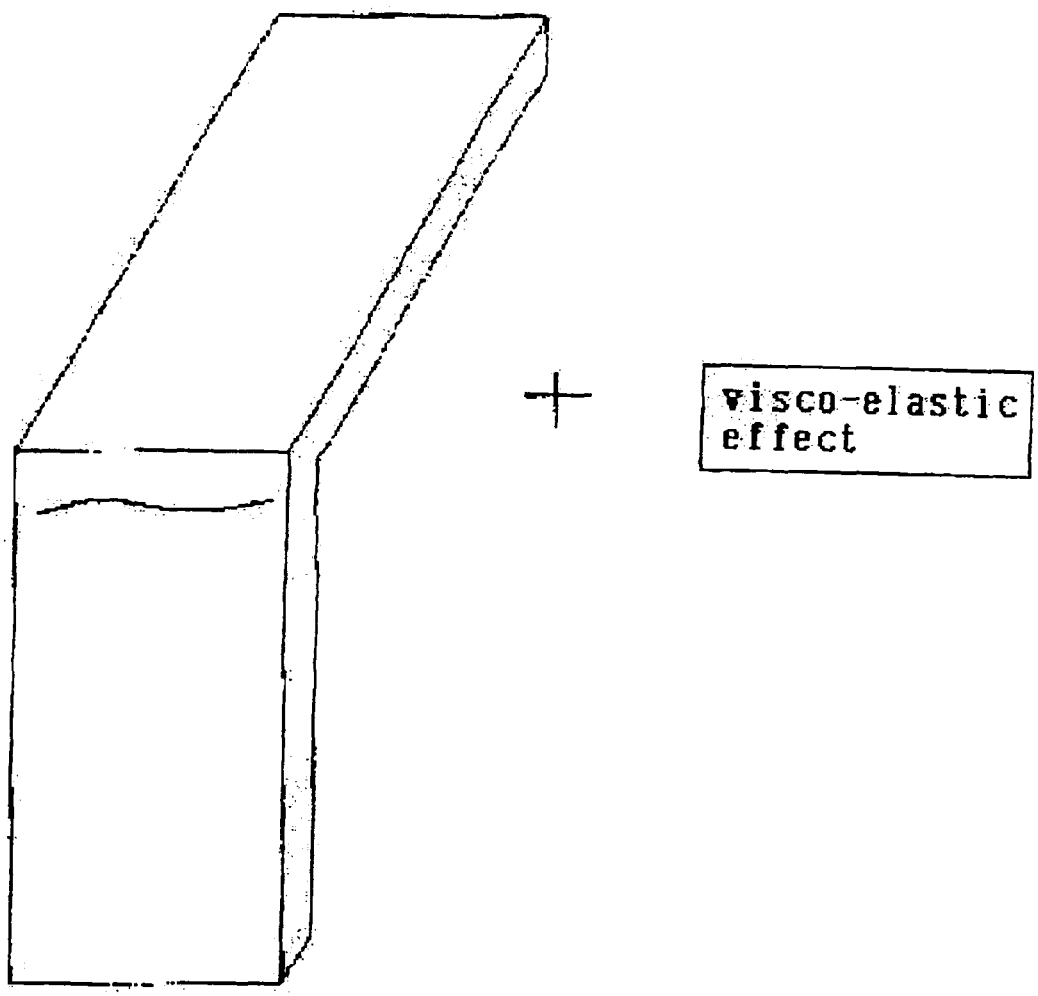

As shown in FIG. 1C, test 3 is a method for testing a geometric effect that a structural shape and polyurethane flowing direction are the opposite by changing the flowability of foams. Foam crack existence and nonexistence at the structural portion causing a change in a form of the foams are evaluated.

Figure 2:
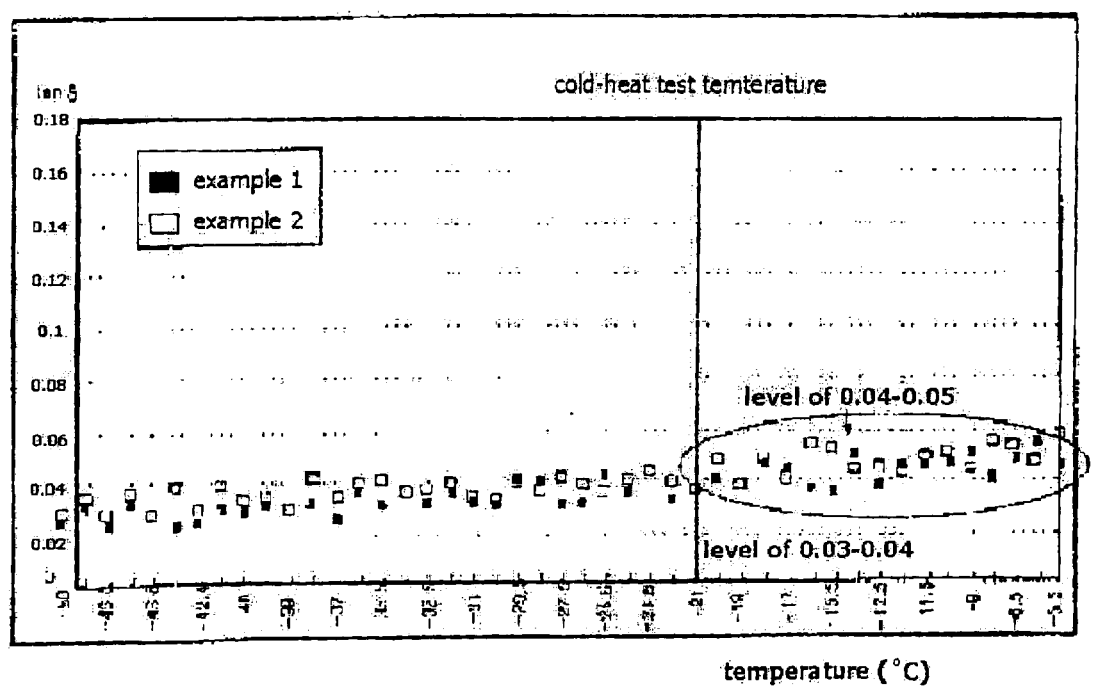
FIG. 2 is a graph showing a measurement result of tan δ of polyurethane foams in accordance with the present invention.

The physical measurement result of each example is shown in Table 2 and tan δ was shown in FIG. 2.

TABLE 2

| Physical property of polyurethane foam | Example 1 | Example 2 |
|---|---|---|
| Core density (kg/m$^2$) | 29.3 | 28.49 |
| Injection amount (g) | 472 | 473 |
| Compression strength (kg/cm$^2$, 25° C.) | 1.43 | 1.42 |
| K-factor (kcal, m.hr.° C.) | 0.0153 | 0.0153 |
| Demoldability (%) | 1.92 | 3.00 |
| Tanδ | 0.03 | 0.04–0.05 |

As observed in the physical measurement results of the examples 1 and 2, it is considered that example 2 exhibits a raw material composition excellent in the aspect of the foam crack besides the basic physical property, and Embodiment 1 exhibits the best combined system in other physical properties except for the foam crack.

As noted in FIG. 2, though example 2 shows a bit high tans value compared to that of example 1, but with no remarkable numeric difference. This is considered a limitation of the HCFC-141b system foam, and when evaluated by testing, the level of example 2 is superior to that of example 1.

Accordingly, it is noted that as the tan δ is increased, the system is favored to the foam crack in the flow direction of polyurethane or in the structural foam.

The biggest factor among factors dominating the physical properties is the combination of polyol. However, every characteristic is not made by the constitution of polyol. Some special basic polyol are critical factors affecting reduction in the amount of catalyst in a strong reactivity and the construction of the system. Thus, in order to have effective characteristics in numerous physical properties such as an overall thermal conductivity, a demoldability, a flowability, a dimensional stability and a strength, the overall construction of the system is important.

As so far described, the raw materials for anti-cracking polyurethane foams and method of preparing the polyurethane foams has advantages that, unlike in the conventional method, the OH value of polyol is lowered down and a catalyst package is changed, to thereby improve a ductility of polyurethane foams. Thus, foam crack does not occur in a refrigerator under a temperature change and low-temperature conditions.

What is claimed is:

1. Raw materials for polyurethane foams comprising:
    100 weight parts of a mixed polyol, over the entire weight of said mixed polyol, consisting of 45~60 wt. % of polyol (a) obtained by polymerization of an organic oxide using sorbitol of a hexa-valent functional group as an initiator, 15~35 wt. % of polyol (b) obtained by polymerization of an organic oxide using toluene diamine (T.D.A.) of a tetra-valent functional group as an initiator, 2.5~7.5 wt. % of polyol (c) obtained by polymerization of an organic oxide using an ester of a penta-valent functional group as an initiator, 10~15 wt. % of polyol (d) obtained by polymerization of an organic oxide using glycerin of a tri-valent functional group as an initiator,
    140~180 weight parts of an isocyanate;
    1.0~3.0 weight parts of a catalyst;
    1.0~2.5 weight parts water;
    30.0~35.0 weight parts of a foam blowing agent; and
    1.0~3.0 weight parts of an additive,
    wherein the OH values of each polyol are 460 for polyol (a), 350 for polyol (b), 330 for polyol (c), and 280 for polyol (d).

2. The raw materials according to claim 1, wherein the mixed polyol additionally comprises, over the entire weight of the mixed polyol, 10 wt. % or below ('0' not inclusive) of polyol (e) obtained by polymerization of an organic oxide using E.D.A of a tetra-valent functional group as an initiator.

3. The raw materials according to claim 2, wherein the OH value is 635 for polyol (e).

4. The raw materials according to claim 1, wherein the catalyst consists of a catalyst 'A' obtained by mixing a gelling agent and a foaming catalyst in a ratio of 1:1, and a trimerization catalyst 'B'.

5. The raw materials according to claim 4, wherein the gelling agent of the catalyst 'A' is DMCHA (N,N-dimethyl cyclohexyl amine), TMHDA (tetra methyl hexane diamine) or TEDA (triethylene diamine), the foaming catalyst of the calalyst 'A' is PMDETA (pentamethylene diethylene triamine) or BDMEE, and the trimerization catalyst 'B' is a tetra-valent amonium salt or 2,4,6-tri phenol.

6. The raw materials according to claim 2, wherein the catalyst consists of a catalyst 'A' obtained by mixing a gelling agent and a foaming catalyst in a ratio of 1:1, a trimerization catalyst 'B' and a strong foaming catalyst 'C'.

7. The raw materials according to claim 6, wherein the gelling agent of the catalyst 'A' is DMCHA (N,N-dimethyl cyclohexyl amine), TMHD or TEDA, the foaming catalyst of the calalyst 'A' is PMDETA (pentamethylene diethylene triamin) or BDMEE, the trimerization catalyst 'B' is a tetra-valent amonium salt or 2,4,6-tri phenol, and the strong foaming catalyst 'C' is formic acid.

8. The raw materials according to claim 1, wherein the foam blowing agent is one or more selected from the group consisting of carboxyl acid and fluoro carbon group foam blowing agents.

9. The raw materials according to claim 1, wherein the additive is a silicon surface active agent.

10. The raw materials according to claim 2, wherein the foam blowing agent is one or more selected from the group consisting of carboxyl acid and fluoro carbon group foam blowing agents.

11. The raw materials according to claim 2, wherein the additive is a silicon surface active agent.

12. A method for preparing raw materials of polyurethane foams comprising the steps of:
    preparing a mixed polyol by mixing, over the total weight of mixed polyol, 45~60 wt. % of polyol (a) obtained by polymerization of an organic oxide using sorbitol of a hexa-valent functional group as an initiator, 15~35 wt. % of polyol (b) obtained by polymerization of an organic oxide using T.D.A of a tetra-valent functional group as an initiator, 2.5~7.5 wt. % of polyol (c) obtained by polymerization of an organic oxide using an ester of a penta-valent functional group as an initiator, 10~15 wt. % of polyol (d) obtained by polymerization of an organic oxide using glycerin of a tri-valent function group as an initiator, wherein the OH values of each polyol are 460 for polyol (a), 350 for polyol (b), 330 for polyol (c), and 280 for polyol (d); and
    mixing 100 weight part of said mixed polyol, 140~180 weight parts of an isocyanate; 1.0~3.0 weight parts of a catalyst; 1.0~2.5 weight parts water; 30.0~35.0 weight parts of a foam blowing agent; and 1.0~3.0 weight parts of an additive, to react them.

13. The method of claim 12, wherein the mixed polyol is prepared by additionally adding, over the entire weight of the mixed polyol, 10 wt. % or below ('0' not inclusive) of polyol (e) obtained by polymerization of an organic oxide using E.D.A of a tetra-valent functional group as an initiator.

14. The method according to claim 12, wherein a catalyst 'A' obtained by mixing a gelling agent and a foaming catalyst in a ratio of 1:1 and a trimerization catalyst 'B' are used as said catalyst.

15. The method according to claim 14, wherein DMCHA (N,N-dimethyl cyclohexyl amine), TMHD or TEDA is used as the gelling agent of the catalyst 'A', PMDETA (pentamethylene diethylene triamine) or BDMEE is used as the foaming catalyst of the calalyst 'A', and a tetra-valent amonium salt or 2,4,6-tri phenol is used as the trimerization catalyst 'B'.

16. The method according to claim 13, wherein a catalyst 'A' obtained by mixing a gelling agent and a foaming catalyst in a ratio of 1:1, a trimerization catalyst 'B' and a strong foaming catalyst 'C' is used as said catalyst.

17. The method according to claim 16, wherein DMCHA (N,N-dimethyl cyclohexyl amine), TMHD or TEDA is used as the gelling agent of the catalyst 'A', PMDETA (pentamethylene diethylene triamine) or BDMEE is used as a foaming catalyst of the calalyst 'A', tetra-valent amonium salt or 2,4,6-tri phenol is used as the trimerization catalyst 'B', and formic acid is used as the strong foaming catalyst 'C'.

18. The method according to claim 12, wherein one or more selected from the group consisting of carboxyl acid and fluoro carbon group foam blowing agent are used as said foam blowing agent.

19. The method according to claim 12, wherein a silicon surface active agent is used as said additive.

20. The method according to claim 13, wherein one or more selected from the group consisting of carboxyl acid and fluoro carbon group foam blowing agent are used as said foam blowing agent.

21. The method according to claim 13, wherein a silicon surface active agent is used as said additive.

* * * * *